United States Patent
Kozloski et al.

(10) Patent No.: US 12,141,812 B2
(45) Date of Patent: Nov. 12, 2024

(54) USER FEEDBACK SYSTEM ON PRODUCT USAGE

(71) Applicant: International Business Machines Corporation, Armonk, NY (US)

(72) Inventors: James R. Kozloski, New Fairfield, CT (US); Michael S. Gordon, Chappaqua, NY (US); Ryan T. Gordon, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 17/671,780

(22) Filed: Feb. 15, 2022

(65) Prior Publication Data

US 2023/0259952 A1    Aug. 17, 2023

(51) Int. Cl.
| | | |
|---|---|---|
| *G06Q 10/10* | (2023.01) | |
| *G06Q 10/06* | (2023.01) | |
| *G06Q 30/016* | (2023.01) | |
| *G06Q 30/02* | (2023.01) | |
| *G06Q 30/0282* | (2023.01) | |
| *G06Q 30/06* | (2023.01) | |

(52) U.S. Cl.
CPC ....... *G06Q 30/016* (2013.01); *G06Q 30/0282* (2013.01)

(58) Field of Classification Search
CPC .......................... G06Q 30/016; G06Q 30/0282
USPC .................................................. 705/1.1–912
See application file for complete search history.

(56) References Cited

U.S. PATENT DOCUMENTS

| | | | |
|---|---|---|---|
| 9,438,678 B2 * | 9/2016 | DeSalvo | H04L 67/12 |
| 10,338,112 B2 | 7/2019 | Micali et al. | |
| 2015/0127556 A1 * | 5/2015 | Harada | G06Q 30/01 705/302 |
| 2016/0274611 A1 | 9/2016 | Amer et al. | |
| 2016/0292768 A1 | 10/2016 | Needham | |
| 2018/0025393 A1 | 1/2018 | Scheel | |
| 2018/0188284 A1 * | 7/2018 | Douglas | G06V 40/23 |
| 2018/0285945 A1 | 10/2018 | Gupta et al. | |
| 2019/0087873 A1 | 3/2019 | Baumann et al. | |
| 2019/0087874 A1 * | 3/2019 | DeLuca | G06Q 30/0282 |

(Continued)

FOREIGN PATENT DOCUMENTS

WO    WO-2020117249 A1 *  6/2020

*Primary Examiner* — Jonathan P Ouellette
(74) *Attorney, Agent, or Firm* — Scully, Scott, Murphy & Presser, P.C.; Aaron Pontikos

(57) ABSTRACT

A system and method that allows use of a product to review its users and generates a report summarizing how closely the product has been used according to its intended use. The product includes on-board and associated I-o-T sensors to differentiate between different users of the same product and provide data correlating usage how the product is used by each user. The system and method provide recommendations regarding how a typical behavior of each user can change during its use to optimize a product's its function, lifespan, efficiency. The report additionally serves to evaluate how effective each user is at rating the product by creating a feedback evaluation report and reliability score for each user, giving weight to basically all product reviews that the user may have submitted on other products. All customer reviews submitted online by a given user can be linked, for example by username, IP address, etc.

17 Claims, 9 Drawing Sheets

(56) References Cited

U.S. PATENT DOCUMENTS

2019/0378178 A1 12/2019 Fox et al.
2019/0385199 A1 12/2019 Bender et al.

* cited by examiner

USER FEEDBACK SYSTEM ON PRODUCT USAGE

FIELD

The present disclosure relates to review of products, and more particularly, to a system and a method employing feedback where the product reviews the user and for determining how closely the product has been used according to its intended use and for recommending user behavioral changes for optimizing a product's function, lifespan, efficiency, etc.

BACKGROUND

Online shopping is the future of consumerism. Consumers spent $453.46 billion on the web for retail purchases in 2017, a 16.0% increase compared with $390.99 billion in 2016 (www.digitalcommerce360.com).

Customer reviews of products form an important means by which people can evaluate the quality of items for potential purchase without ever having seen them. These reviews can be a measure of nearly every aspect of an item, from how long it will last, to how well it will work in different situations. In the context of consumer product review/product feedback submission however, several important questions arise: How reliable are these reviews in reality? Can a potential purchaser really trust a product review that was written by someone the purchaser never met? How reliable are the statistics generated by a five-star system, especially in cases where there are very few reviews submitted for a product? In addition, do enough people leave online reviews for products to generate a reliable distribution that is properly weighted for all types of users?

Most importantly, product reviews do not indicate how the products were used by the reviewer. For instance, whether the product (e.g., a book) was actually read by a book reviewer, used occasionally by a homeowner reviewer, or was used constantly and abused by a contractor reviewer matters significantly in how a product review should be interpreted.

Recently, on-line retailers such as Amazon have added a feature on their websites verifying that reviewers have actually purchased the item(s) that they were reviewing, however this is a minor improvement.

SUMMARY

According to a first aspect, there is provided a "smart" system and method and computer program product for improving an analysis of a product's usage by users/reviewers.

In one aspect, the system includes a sensor-based feedback system running methods for monitoring product usage by its users to ascertain and evaluate how the product is being used, e.g., whether it is being used correctly as intended.

In a further aspect, the sensor-based feedback system employs a wearable technology associated with user reviewers and employs Internet-of-Things (I-o-T) technology embedded in the products themselves that allow a product to provide sensor data feedback on how each user reviewer is using the product.

The running of methods for analyzing product usage feedback and monitoring product usage by its users serves as a means to "ground" an on-line review system and provides a means to augment and measure the reliability of each review posted by any given user.

In a further aspect, the system and method also serves as a means to evaluate how effective each user is at rating the product by creating a feedback evaluation report and reliability score for each user, giving weight to basically all product reviews that the user may have submitted on other products.

In yet another aspect, the system and method further provides a feedback system for providing recommendations regarding how the typical behavior of each user can change during a product's use to optimize its function, lifespan, efficiency, etc.

In one embodiment, there is provided a method for product evaluation. The method comprises: sensing, using one or more onboard sensor devices, one or more different aspects of the product's operation by a user; recording, at a programmed processor at the product, data relating to the different aspects features of the product's usage by one or more users; generating, using the programmed processor at the product, a data report summarizing sensed product usage behaviors in which a product is being used by each one or more users; and linking the generated data report associated with a user to a review submitted on-line by the user, wherein subsequent third party reviewers can access the data report linked to the on-line review generated by a user.

According to a further embodiment, there is provided a system for evaluating a product. The system comprises: at a product, one or move onboard sensor devices for sensing one or more different aspects of the product's operation by a user; a processor and a computer-readable memory coupled to the processor, wherein the memory comprises instructions which, when executed by the processor, cause the processor to: record at the product, data relating to the different aspects features of the product's usage by one or more users; generate at the product, a data report summarizing sensed product usage behaviors in which a product is being used by each one or more users; and the generated data report associated with a user linked to a review submitted on-line by the user, wherein subsequent third party reviewers can access the data report linked to the on-line review generated by a user.

In a further aspect, there is provided a computer program product for performing operations. The computer program product includes a storage medium readable by a processing circuit and storing instructions run by the processing circuit for running a method. The method is the same as listed above.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

Embodiments are described in more detail in conjunction with the accompanying drawings, in which.

DETAILED DESCRIPTION

The present disclosure provides a product usage analysis framework employing sensors for automatically monitoring a product's usage and providing usage feedback to evaluate how the product is being used. Based on the product usage information feedback, the system determines whether the product is being used as intended and makes recommendations as to optimize product usage, e.g., increase product efficiency, increase product lifetime, etc. Further, using this information, any on-line review of the product provided by a user can be evaluated for its veracity, and in particular, the reliability of the product user. In this aspect, the product generates usage reports for a specific user to indicate how that product was being used by that user. From these data, the framework calculates a reliability score for a given user indicating how closely a given user follows the guidelines for the usage of a product that they review.

Figure 1:
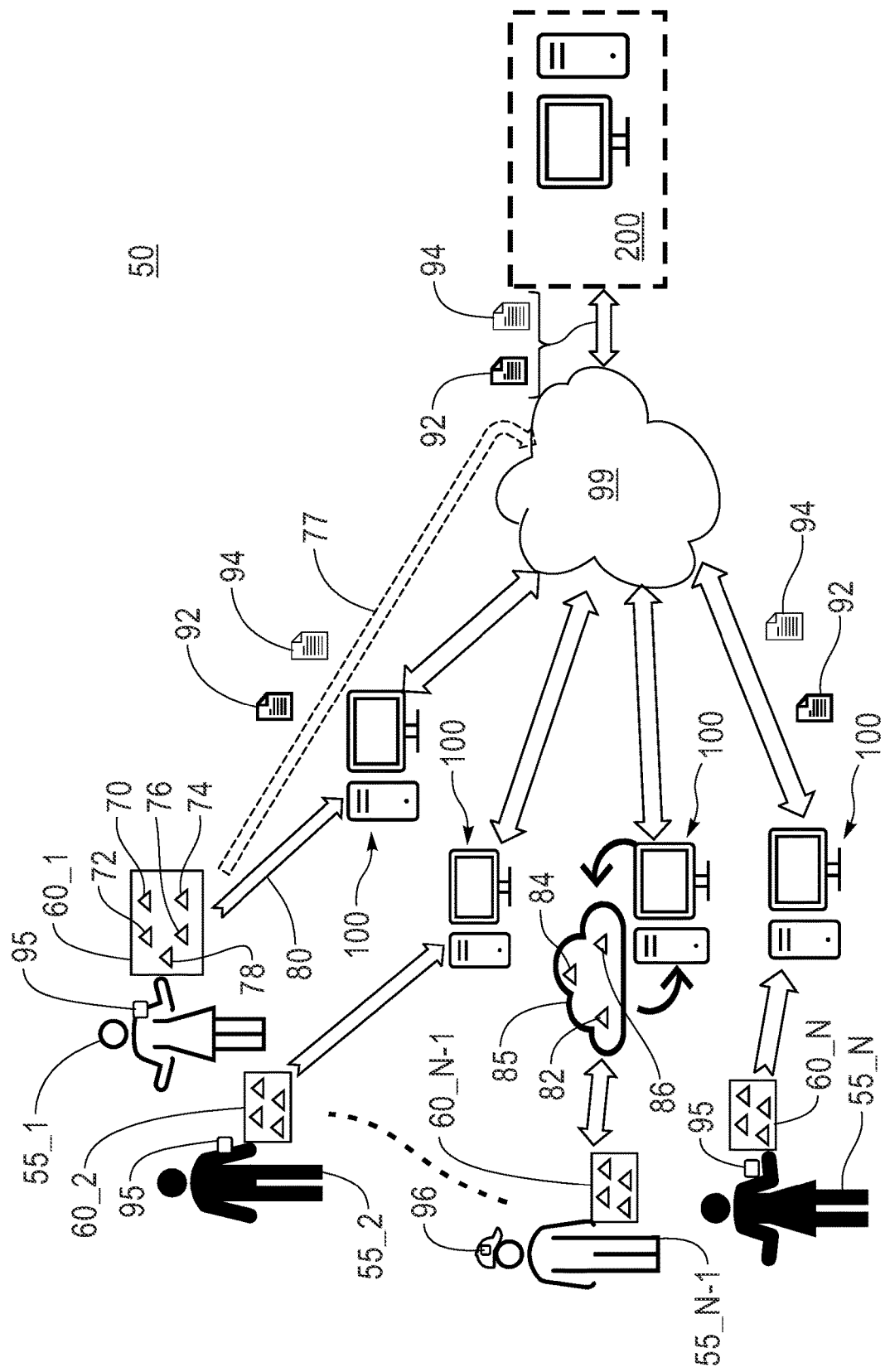
FIG. 1 depicts a product usage analysis system providing an approach for evaluating a user based on that user's product usage.

FIG. 1 depicts a product review system framework 50 providing an approach to evaluating a user based on that user's product usage. The framework includes a computing system 100, e.g., associated with each user, that is configured to run methods to automatically receive sensor feedback relating to users' usage of products. In an embodiment, based on the received sensor feedback, the system framework 50 generates reports that allow a product to evaluate each user's product usage. Such generated reports can be used for assessing the integrity of customer on-line product reviews submitted by the user and/or for guiding the user to use the product more optimally.

As shown in the system framework 50 of FIG. 1, a plurality of users 55_1, 55_2, ..., 55_N-1 and 55_N are each shown using a product, e.g., respective products or devices 60_1, 60_2, ..., 60_N-1, 60_N. Each product can be manufactured to include a plurality of "on-board" sensors for sensing aspects of that product's usage. Alternately, each product can be sold with or provided with additional "add-on" sensor components for sensing aspects of that product's usage. In embodiments, the user of the product can be provided with a garment or wearable device having sensors (wearable sensors) to be used for sensing aspects of that product's usage.

In a non-limiting embodiment, and by way of illustration, an exemplary product, e.g., product or device, e.g., product 60_1 associated with a corresponding user 55_1, can include one or more sensors such as: an onboard camera 70 configured to provide video input on the device's usage; an on-board microphone 72 configured to provide audio input on the device's usage; an on-board accelerometer 74 configured to provide input on forces applied to the device during its usage; and an on-board thermometer 76 configured to provide data indicating how "hot" the product got while in use (or indicating an amount of heat generated by the product) and/or the ambient temperature when the product was used.

A further sensor 78 can be provided to differentiate between different users of the same product. For example, a husband/wife might use the product 60_1 very differently on the same or different projects. Such a sensor can comprise a biometric sensor, e.g., a sensor configured to detect a user fingerprint to identify the particular user. In an embodiment, the sensors 70, 72, 74, 76, 78 can operate wirelessly and can be added on to or assembled with the product prior to its use. These sensors can be sold separately or included as part of a kit with the product.

These sensors 70, 72, 74, 76, 78 in or on the product or device are designed to take input on how the product or device is being used by each user. These sensors 70, 72, 74, 76, 78 in or on the products or devices 60_1, 60_2, ..., 60_N-1, 60_N for a respective user are configured for wired and/or wireless communication with a local computer system 100 associated with the respective user 55_1, 55_2, ..., 55_N-1 and 55_N. Local computer system 100 include software modules running programs for receiving and/or processing data received by sensors 70, 72, 74, 76, 78.

As further shown in FIG. 1, depending upon the type of device or in an environment where the product is used, the user, e.g., users 55_1, 55_2, may have or be provided with one or more wearable sensors 95 such as an accelerometer that is/are configured for sensing posture, gait, limb movements, etc. during use of the product and for generating appropriate wireless accelerometer sensor signals (not shown). Local computer system 100 includes additional software modules running programs for receiving and/or processing such accelerometer sensor signals, e.g., combined with the other sensor data input(s) 80.

As further shown in FIG. 1, depending upon the type of device or in an environment where the product is used, the user may be provided with a wearable identifier tag 96, e.g., a bar code or quick response (QR) code, for use to automatically identify the user of the product. This wearable identifier may be sensed by an on-board product sensor, e.g., a camera 70, or an Internet-of-Things (I-o-T) sensor such as a bar code reader or QR code reader located near or proximate the user or product.

As further shown in FIG. 1, a user can use a product in an environment that includes one or more I-o-T sensors available to interact with the user and/or user product to provide further data for use in determining a usage of the product. As an example, FIG. 1 shows an environment 85 within which a user, e.g., user 55_N-1, uses a product, e.g., product 60_N-1. In an environment 85, there is located one or more I-o-T sensors, e.g., sensors 82, 84, 86, that can obtain additional usage feature data to be used for evaluating the user and usage of that user's product. As an example, an I-o-T sensor 82 can be a proximately located bar code scanner that can scan the user's bar code identifier 96 for identifying the user of the corresponding product 60_N-1. Data from I-o-T sensors associated with product usage or customer identification are received as further input to computer system 100. Generally, sensors on other products that are connected to the main product, e.g., product 60_N–1, by internet of things (I-o-T) sensors are configured for collecting data on how the main product has been used and can upload those data to the main product to be included with its usage report, or alternatively uploaded to computer system 100 for usage report generation.

In embodiments, the sensor data associated with product usage or customer identification from the on-board sensors at the product, e.g., sensors 70, 72, 74, 76, 78, and/or data from I-o-T sensors 82, 84, 86 proximately located to the user, are communicated as input to respective local computer system 100. In an embodiment, local computer system 100 is configured to generate a product usage report 92 describing specific usage of the product by each user of the product (as multiple users can use the same product differently) and/or a feedback evaluation report 94 describing aspects of the usage, e.g., statistics pertaining to the product usage and whether the product is being/has been used within a defined tolerance or operated within intended parameters, e.g., to ascertain if the product has been optimally used (or abused). Alternately, the product or device itself can generate the product usage reports 92 and/or feedback evaluation reports 94 and the product can be connected with local computer system 100 to download these reports directly to the local computer system. In embodiments, a single usage report is generated with each product usage and aggregate or summary statistics corresponding to the raw data.

In view of FIG. 1, ultimately, product usage reports 92 and/or feedback evaluation reports 94 are uploaded to a web server or like computing system 200 associated with a manufacturer of the product and/or an on-line retailer, e.g., Amazon®, that receives on-line customer product reviews, or a third-party analytics platform. In an embodiment, computing system 200 runs methods for associating customer usage reports and/or feedback evaluation reports with the customer usage product reviews for publication with the review at the web-site. For example, each computer system 100 can be connected to computing system 200 via a communications network 99 such as the Internet. Alternatively, the usage reports 92 and/or feedback evaluation reports 94 generated at the product itself can be directly communicated via communication links 77 to computing system 200 via a network (e.g., Internet) connection.

Figure 2:
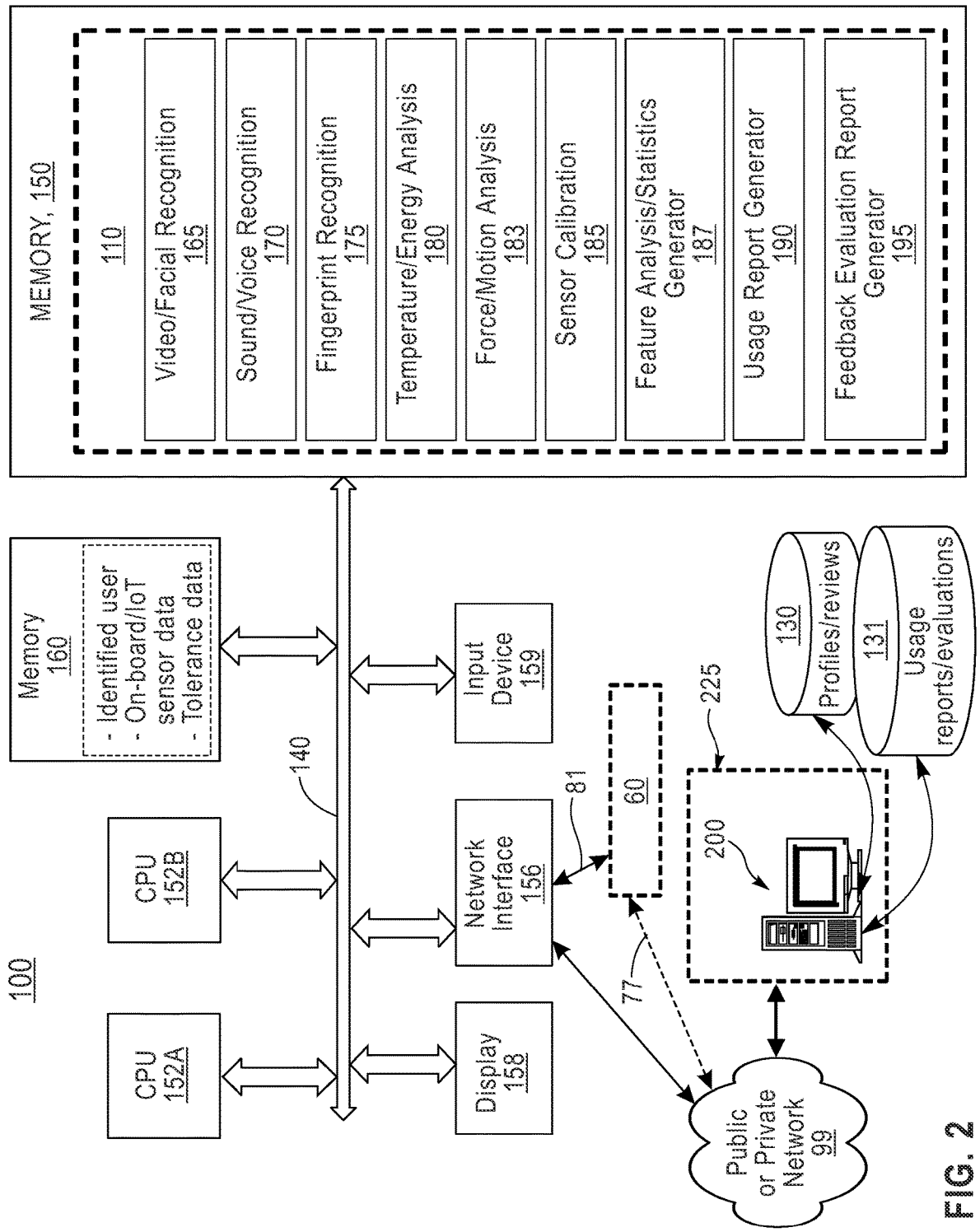
FIG. 2 depicts an embodiment of a computer system for providing a product usage analysis framework for enabling a product to review its users and for generating a report summarizing how closely the product has been used according to its intended use.

FIG. 2 depicts a computer system 100 providing an embodiment of a product usage analysis framework for enabling a product to review its users and generate a report summarizing how closely the product 60 has been used compared to its intended use and it can provide recommendations regarding how the typical behavior of each user can change during the product's use to optimize its function, lifespan, efficiency, etc. As an example, suppose the product 60 has typically been used in freezing temperatures and the battery charge is shorter than anticipated. The product can make recommendations to the users that the battery range could be extended by 50% is the product was used at warmer ambient temperature. In some aspects, system 100 may include a computing device, a mobile device, or a server. In some aspects, computing device 100 may include, for example, personal computers, laptops, tablets, smart devices, smart phones, or any other similar computing device.

In further aspects, one or more components of the system depicted in FIG. 2 are included in the product 60 itself to generate product usage and feedback evaluation reports for download to the computer system 100.

Computing system 100 includes one or more hardware processors 152A, 152B, a memory 150, e.g., for storing an operating system, functional modules and associated program instructions, a network interface 156, a display device 158, an input device 159, and any other features common to a computing device. In some aspects, computing system 100 is a computing device that is configured to receive on-board and/or I-o-T sensor data and/or generated product usage reports directly from a user product 60 over links 81, or alternatively is configured to generate product usage reports based on received on-board product/I-o-T sensor data. Additionally, computing system 100 is equipped with a browser program configurable to access a web-page associated with a web-site 225 in communication with an associated web- or cloud-based server or like computing device 200 over a public or private communications network 99. For instance, a web-site 225 may be associated with the product's manufacturer, an associated on-line retailer or an associated analytics platform. In either case, such a web- or cloud-based server or like computing device 200 maintains customer profile information and/or receives and associates on-line product reviews from users associated with product purchases.

Such a web- or cloud-based server or like computing device 200 associated with corresponding web-site 225 can receive communications and respond to communications 77 directly from the product and over communications links 81 via the network interface provided at the computer system 100. Such a web- or cloud-based server or like computing device 200 can comprise an analytics platform that takes product telemetry about the product's use and associates that use with the user's identity and flags the user with a review of that product's use by that user. The web- or cloud-based server or like computing device 200 includes an associated database 130 configured to maintain customer or user information, e.g., user profile, warranty registration, or like information associated with purchasers of the product. The database 130 may further store user reviews associated with any product reviews received. In a non-limiting, illustrative embodiment, a further database(s) 131 associated with a web- or cloud-based server or like computing device 200 includes information such as usage reports and feedback evaluation reports generated by the products or by the user computing system 100.

Further, as shown as part of system 100, there is provided a local memory useful for generating a usage report summarizing how closely the product has been used according to its intended use and/or gathering data useful providing evaluations regarding the product's use. Local memory may include a cache, an attached memory storage device 160, or a remote memory storage device, e.g., a database, accessible via a remote network connection for input to the system 100.

In the embodiment depicted in FIG. 2, processors 152A, 152B may include, for example, a microcontroller, Field Programmable Gate Array (FPGA), or any other processor that is configured to perform various operations. Additionally shown are the communication channels 140, e.g., wired connections such as data bus lines, address bus lines, Input/Output (I/O) data lines, etc., for routing signals between the various components of system 100. Processors 152A, 152B are configured to execute method instructions as described below. These instructions may be stored, for example, as programmed modules in a further associated memory storage device 150.

Memory 150 may include, for example, non-transitory computer readable media in the form of volatile memory, such as random access memory (RAM) and/or cache memory or others. Memory 150 may include, for example, other removable/non-removable, volatile/non-volatile storage media. By way of non-limiting examples only, memory 150 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from a product 60, e.g., via wired or wireless connections 81 or alternately, to and from a web-site server 200 associated with the manufacturer, on-line retailer, or analytics computing platform. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 100 to transmit information to or receive information from the server 200.

As further shown in FIG. 2, display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/e-ink display, an organic LED (OLED) display, or other similar display technologies. In some aspects, display 158 may be touch-sensitive and may also function as an input device.

Input device 159 may include, for example, a keyboard, a mouse, a touch-sensitive display, a keypad, a microphone, or other similar input devices or any other input devices that may be used alone or together to provide a user with the capability to interact with the computing device 100.

With respect to configuring the computer system 100 as a product usage analysis framework for enabling a product to review its users and generate/process a report summarizing how closely the product has been used compared to its intended use and provide recommendations regarding how the typical behavior of each user can change during its use to optimize its function, lifespan, efficiency, etc., the local or remote memory 160 may be configured for temporarily storing data 162 including one or more of: an identified user and received sensor data from the on-board product sensors and/or I-o-T sensors associated with a current use of the product and/or tolerance values associated with a range of proper use conditions of the product/device.

Further, memory 150 of computer system 100 further stores processing modules that include programmed instructions 110 adapted to invoke product usage analysis framework operations for generating product usage reports 92 and/or feedback evaluation reports 94. In an embodiment, such reports can be used for assessing the integrity of customer on-line product reviews and/or for guiding the user to use the product more optimally.

In one embodiment, as the product's on-board sensors or alternatively, local I-o-T sensors can be employed to differentiate between different users of the same product so that, for each use of the product, all data received from on-board sensors and/or I-o-T sensors is associated with the identified user, one or more of the programmed processing modules stored at the associated memory 150 include code running methods functioning to identify product users.

For example, one of the programmed processing modules stored at the associated memory 150 include a video/facial recognition software module 165 invoking methods, functions and routines to receive and process video data collected from an onboard camera sensor 70. For example, the product's on-board camera (or like I-o-T sensor) can be used to obtain video signals of the current user and the video/facial recognition module 165 can correlate the current user with a use of the particular product. In an embodiment, the on-board camera sensor can also be used to sense a result of the use of the product, e.g., a drill hole size and the video recognition aspect of software module 165 can record this usage.

In an embodiment, a programmed processing module stored at the associated memory 150 include a sound/voice recognition analysis module 170 running methods to receive and process audio data collected from microphone sensor 72. For example, if a user of the product can not be identified, the product can prompt the user to state their name and the voice recognition analysis module 170 can process audio data for identifying the user. Sound recognition analysis functions can be used in association with video recognition functions to detect sounds emanating from the product or sounds emanating from particular projects associated with the product's use. For example, a sound of a product, e.g., a lawnmower, mowing over a rock or tree stump, as compared to grass, can be detected by sound recognition module and recorded for that product's usage report which may eventually be used to indicate a misuse of the lawnmower product by the identified user.

As a further example, a programmed processing module stored at the associated memory 150 includes a fingerprint recognition analysis module 175 running methods to process received sensed fingerprint data for identifying a product user by recognizing a fingerprint of a user based on data received from the product that is sensed when the user holds or touches the product.

As a further example, a programmed processing module stored at the associated memory 150 include a temperature/energy analysis module 180 running methods to process received sensed temperature data for detecting a temperature of the device while in use, and/or the ambient temperature when the product was used and/or determining an amount of energy expended by the device while the identified user is using the product 60.

As a further example, a programmed processing module stored at the associated memory 150 include a force/motion analysis module 183 running methods to process received sensed accelerometer or strain gauge data for detecting an acceleration or force applied by the product or applied to the product while in use. This analysis module 183 can also be used for determining an amount of acceleration of force applied by the current identified user while using the product 60. For example, an accelerometer can measure the "g-force" a product 60 is subjected to if the user drops the product. Similarly, a strain gauge can measure the force used by a user of product 60, when, for instance, a drill bit breaks. If the user purchased the drill bit separately from the drill, the force measured by the drill may be similarly associated with the user's review of the drill bit.

In a further embodiment, a programmed processing module stored at the associated memory 150 can include a calibration module 185 invoking methods for calibrating the on-board sensors on a periodic basis to ensure accurate data are taken regarding the usage of the product by each of its users. As an example, to aid with routine calibration of the onboard sensors, the product can prompt the user to perform certain tasks, for example, to tap on the side of product 50 to aid with calibrating the accelerometer.

In a further embodiment, a programmed processing module stored at the associated memory 150 includes a feature analysis/statistics generator module 187 running methods to gather and process received sensor data associated with a current user's product usage for generating a report summarizing a range of the ways in which the product was being used.

In an embodiment, the computer system 100 and/or product 60 may include a data file (not shown) that indicates product use tolerance values associated with a range of proper use conditions of the product/device as provided by the manufacturer. Based on manufacturer provided product use tolerance values associated with a range of proper use conditions of the product/device the feature analysis/statistics generator module 187 can determine whether the product has been misused, e.g., by comparing data received from the sensors inputs with the well-defined tolerance values for its use. For example, a product is specified to have 10 N of vertical force applied during its use, but the strain gauge sensor recorded 12 N for a total time of 5 seconds while one user was using the product. The software on the computer system 100 (or on the product itself) can generate a report for this specific user to indicate this. In response, the product and/or computer system 100 can emit a warning signal or raise a flag indicating that perhaps this user was using excessive force with the product or mis-handled or misused the product.

In an embodiment, the information regarding manufacturer use tolerance values provided by the manufacturer in the data file may be searchable by shoppers and used to compare products' use tolerances from different manufacturers. In this way, a virtuous cycle is established, whereby user reviews are more meaningful in the context of information about the users' exceeding manufacturer proscribed tolerances, but manufacturers with low tolerance (i.e., shoddy products) will be identifiable at the time of purchase.

As a further example, a product 60 can include LED lights to illuminate the project being worked upon by the product. For instance, some drill/drivers contain a plurality of LED lights that automatically turn on when a trigger is pressed and turn off a few seconds after the trigger is released. In one embodiment, one or more LED's could be replaced with a small camera sensor to record the product's use. The camera could record that the product, e.g., a drill tool, was used to drill large holes through multiple pressure treated 4"×4" posts or used to drive small screws into sheet rock—thus recording two extreme uses of the same drill tool.

As a further example, for a given user, the range and history of a metric could be recorded. For instance, in the case of a user of a portable drill or screw driver, the feature analysis will record, for each user, the number of times the user used the portable drill/driver to screw deck screws to attach the deck boards to the joists and also record the ambient temperature. Module 187 further provides methods for summarizing the data to indicate that the battery life was an hour, at 30° F., driving fifty 3" screws.

In an embodiment, the computer system 100 and/or product 60 includes a usage report generation module 190 running methods, functions and routines for receiving raw sensor data from the sensor devices and any associated processed data from the recognition and analysis modules. A similar feedback and evaluation report generator module 195 runs methods, functions and routines for processing the raw sensor data and generate summary statistics, for example, e.g., based on a user's usage of the product over time. For example, such feedback evaluation report generator 195 can generate and report on whether a product's use has complied with product use guidelines (i.e., was operated within recommended manufacturer tolerance values associated with a range of proper use conditions of the product/device) or outside of the specified use conditions. Association of this report with a user review of the product may require that the manufacturer's product use tolerance parameters. For example, based on processed raw data, statistics generator module 187 can generate analysis data such as average applied forces applied by/to the product, the average ambient temperatures of environments within which the product was used, average torque settings associated with the uses of a particular tool, etc. which summary or statistics data can be used to determine and evaluate whether that user's product use has complied with manufacturer use guidelines, also reported, for that product.

Figure 3:
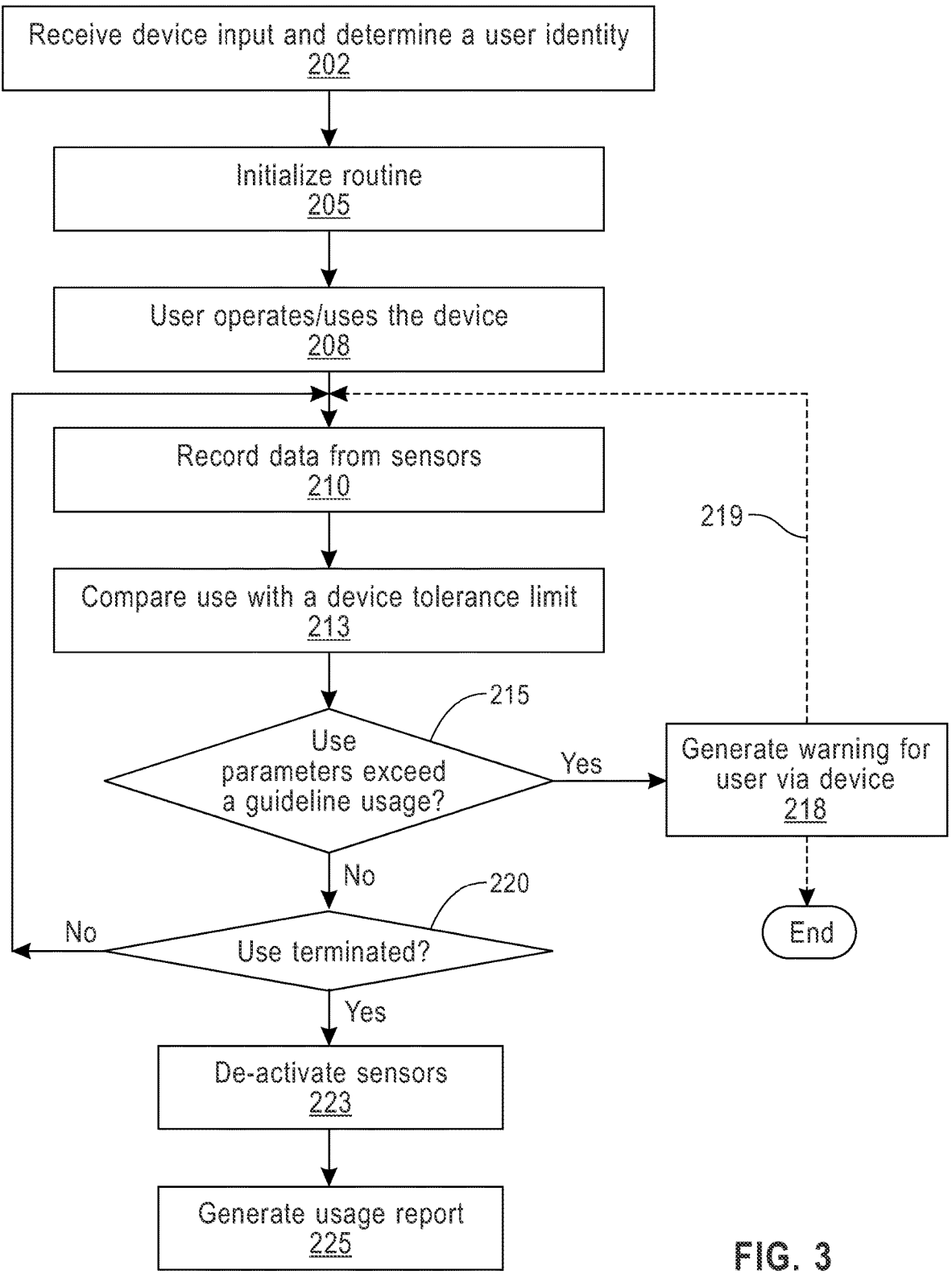
FIG. 3 depicts an embodiment of a method run at the user product, e.g., a tool or device and/or the associated computer system for receiving data from the user's product tool or device.

FIG. 3 depicts a method run at the user product, e.g., a tool or device 60 and/or the associated computer system 100 receiving data from the user's product tool or device. In an embodiment, at 202, the device senses a user product device being turned on and manipulated for a current usage. An initialization routine can be instantiated, whether it be a biometric sensor or on-board camera and facial recognition software to detect an identity of the current user for association with the current use. Alternatively, voice recognition software is be provided that can be used to detect the identity of the current user wherein the system learns the identity of the user by a training session where the users' voices are recorded. Depending upon the product, at 205, the initialization routine can detect and record the current time (i.e., record a current timestamp) and/or activate on-board sensors and/or I-o-T sensors for detecting and recording usage aspects and/or parameters (e.g., forces, accelerations, ambient temperatures, current torque settings for a particular tool such as a drill, screwdriver, or ratcheting wrench, etc.). At 208, there is detected the user's operation/use of the product. Then, at 210, a loop is entered to record data from sensors as the product is being used. This may include recording video associated with the project upon which the product is being used (e.g., wood being cut by a saw, or holes being drilled by a drill), sound data detected from the on-board microphone, the device temperature from an on-board thermometer, a pressure or device orientation sensing from one or more on-board strain gauges or accelerometers, a device current or battery charge level, etc. While the product is being used, these sensor data from the device sensors can be continuously or periodically recorded. While the product is being used, at 213 a comparison can be made to compare current usage parameter with any manufacturer defined tolerance or usage limit guideline. At 215, a real-time or near real-time analysis is conducted to determine if the detected current use parameters exceed a particular guideline threshold or limit, e.g., a use exceeding a temperature or applied pressure limit. If, at 215, it is determined that the detected current use parameters exceed a particular guideline threshold or limit, then at 218, there can be displayed a warning or message to the user via the product indicating a potential misuse of the device. As an example, the displayed warning might indicate that the user should let the product 60 cool off if the temperature sensor indicates that the product is overheated from repeated use. The user, in response, can either end the usage or proceed with the product's recommendation, for example, or alternatively continue device usage at 219. In an embodiment, the product usage sensor data may be communicated in real-time to the manufacturer, and in response, the manufacturer may make a usage recommendation, e.g., changing a product setting, based on reviewing the on-board data. In embodiments, the device itself may terminate the current usage by that user, e.g., by automatically turning off.

Otherwise, in FIG. 3, at 215, if, as a result of the real-time or near real-time analysis, it is determined that the usage parameters do not exceed a guideline usage or use tolerance limit, the user can continue using the device while the device or computer device keeps recording sensor data and concurrent usage parameters. Continuing to 220, a determination is then made as to whether the product usage has been terminated, i.e., a detection that the user has terminated the current use. If no product use termination has been detected, i.e., the device is still currently in use, the method is shown as returning to 210 such that the sensors can still record usage parameters and repeat the subsequent steps 213, 215, 220. Until the current device usage has terminated, the sensor data will continue being recorded. However, at 220, once the current product usage has been detected as terminated, the sensors will be de-activated at 223 and the recorded data be summarized for transmission to the manufacture, or the user's computer device 100 if the data was not recorded at the device. Then from this data, or after a predetermined number of usages, the system can generate a usage report and/or feedback evaluation at 225, for reporting to the manufacturer and/or on-line retailer.

Figure 4:
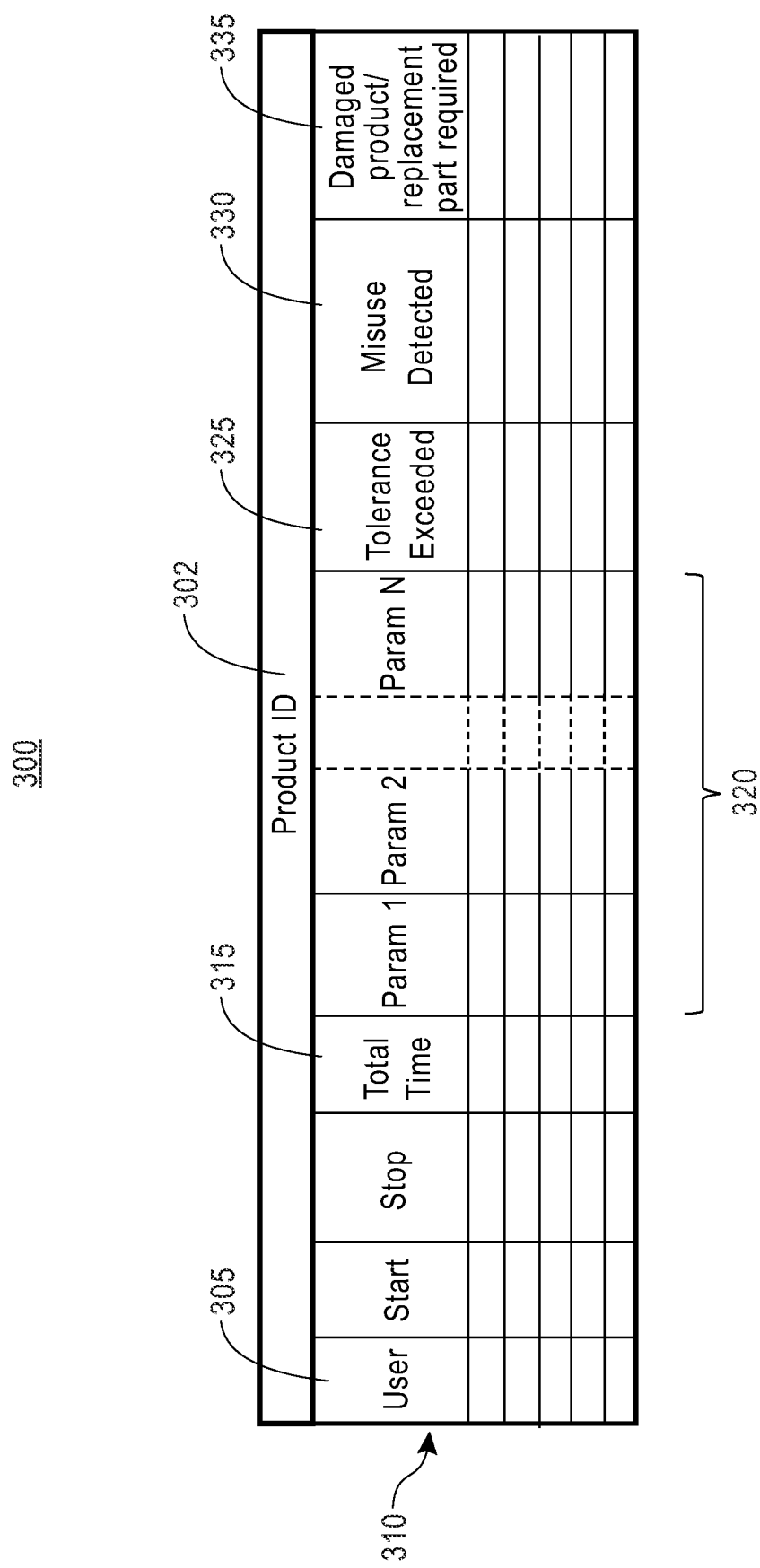
FIG. 4 depicts a non-limiting example of a usage report that is generated at the user's product or by a computing system associated with the user.

FIG. 4 shows an exemplary embodiment of a usage report 300 that is generated at the user's product 60 or by computing system 100 associated with the user. As shown in FIG. 4, the report 300 indicates the product being used such as by a product ID 302 and a first column 305 of usage report 300 includes the recognized/identified user who has used the device. Subsequent entries along a row 310 of the report indicate the recorded data pertaining to each usage of the product by that identified user. In an alternative embodiment, the recording of data pertaining to each usage can be an "opt-in" process so that all data for a product's use does not necessarily get shared with the manufacturer. For example, a second column can indicate the start timestamp of the usage and a second column can indicate a stop timestamp with a total usage time (or duration) for each use recorded in the next column 315. Further columns 320 indicate one or more parameters associated with the product usage. For example, in the case of using a product such as an electric drill, such parameters in columns 320 can include raw data indicating the torque settings, a range of battery charge during use, an ambient indoor or outdoor temperature when the product was used, a project that the drill was used on. Determining a project that the product is being used on can be determined automatically, e.g., by use of an on-board camera, or alternatively, a user can enter the project in the report. One or more of the parameter data obtained can be from I-o-T devices connected to the product or I-o-T devices sensing parameters in conjunction with the product's use. A further column 325 indicates a result of a feedback evaluation analysis such as whether a use tolerance has been exceeded, e.g., an on-board strain gauge detects a user applying a force by the product exceeding a manufacturer defined force limit for a predetermined amount of time, or a saw has been used to cut a piece of wood that exceeds beyond a recommended size or thickness limit or that is used to cut a type of wood (e.g., a hardwood) that that the particular saw blade was not designed for use to cut as determined by video or image captured by on-board sensors and applied logic. A further column 330 is a flag indicating a result of a further feedback evaluation analysis conducted to determine if any use of the product by the user indicated a potential misuse. For example, a user intentionally using the product in a manner exceeding a recommended tolerance (e.g., when applying a force using the product exceeding a predetermined time period) can be deemed a misuse, while a user temporarily dropping the product that results in detecting an applied acceleration exceeding an acceleration limit tolerance for a duration less than a predetermined time period may not be deemed a misuse. As another example, a product such as a lawnmower can be provided with a manufacturer's recommendation suggesting that the user avoid mowing over objects such as rocks, tree roots and stumps in order to preserve/increase the lifetime of the lawnmower blade. However, an on-board camera device may reveal that the user continually did mow over such objects which would constitute a misuse. Referring further to the usage report 300 of FIG. 4, a further column 335 may indicate that a replacement part on the device is required and that the user may have used the product with a damaged part. This need for a replacement part may be determined by measuring certain parameters, e.g., at product initialization, and comparing these measured parameters against manufacture recommended limits. As in the lawnmower example, an onboard accelerometer might register a higher than initial level of acceleration (e.g., when the lawnmower is idling) as a result of an imbalanced blade caused by running over a rock.

The usage report 300 of FIG. 4 can be updated over time for each subsequent use by the same and/or different users and can be aggregated for storage at the user's computing system 100 and/or uploaded for storage/recordation at a server associated with the product manufacturer. In an embodiment, a further survey (not shown) of a product's use could be administered to and completed by the user to supplement or compare to the usage report and/or the on-board sensors data.

In a further embodiment, a user can subsequently provide/upload a product review to a manufacturer web-site and/or provide/upload a product review to an on-line retail web-site that sells the product. Once the usage report 300 is generated, it can be uploaded to an online retailer in conjunction with a product review submitted by that user. In such embodiments, the particular user's usage report and manufacturers' tolerance parameters can be associated with that respective user's product review.

Figure 5:
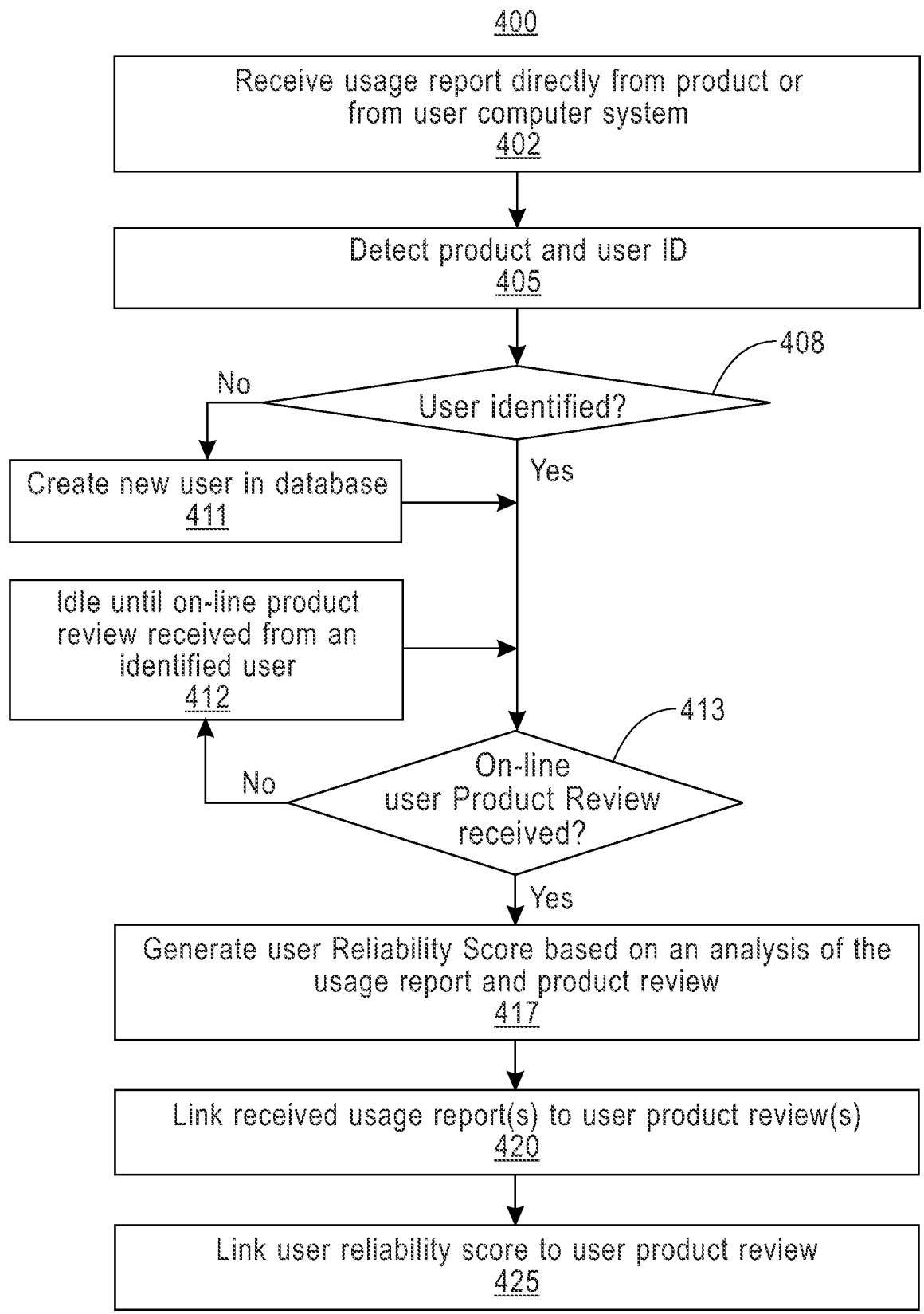
FIG. 5 shows one embodiment of a methodology executed at a manufacturer web-site server and/or on-line retailer web-site server to indicate a reliability of the user's on-line product review.

FIG. 5 shows a method 400 executed at manufacturer web-site server and/or on-line retailer web-site server to indicate a predicted reliability of the user's on-line product review. For example, at 402, there is depicted a step of receiving a user's usage report directly from the product, from the manufacturer computer server and/or from the user's computer system 100 storing the updated usage report. At 405, the system detects the product and the user ID indicated in the report and, at 408, identifies whether the user is known in the manufacturer's database system as being a purchaser of the product and/or known in the on-line retailer database system as being an on-line purchaser of the product. If it determined at 408 that the current received user report is associated with an unknown user, then at 411, a new user entry is created in the manufacturer's database system and/or on-line retailer database system and the method proceeds to 413, FIG. 5. Otherwise, at 408, if it is determined that the user is known, the process proceeds directly to 413, FIG. 5. At 413, a determination is made as to whether that identified user has submitted an on-line review of the product. If it is determined that the identified user has submitted an on-line review of the product, then the process proceeds at 417 where the manufacturer or on-line retailer or analytics platform generates a user reliability score based on the content of both the received usage report and the received on-line product review. Otherwise, at 413, if it is determined that the identified user has not submitted an on-line review of the product, the process can either end, e.g., time out, and/or idle at 412 until an on-line product review is received that can be associated with the identified user in which case the process returns to 413.

Referring to step 413, once an on-line review of the product is submitted by the user, the system generates a reliability score at 417 to indicate the veracity of the product review given the user's product usage report. Such a reliability score is generated for the user to rate how closely that user followed the suggested guidelines for how a product should be used, giving weight to how reliable customer reviews written by that user should be taken. As an example, a high reliability score may indicate a correlation of a positive on-line product review submission with a usage report indicating that the product was not misused, or alternatively, a low reliability score may indicate a correlation of a negative on-line product review submission with a usage report indicating that the product was misused. For example, a user uploading a poor review of a utility trailer, claiming that its axle broke, may have a low reliability score because of multiple usage reports from pickup trucks owned over the past decade indicated frequent overloading beyond their manufacturers' published load tolerances. As a further example, if the particular identified user is known to write on-line reviews pertaining to durability of a product, an analysis of that user's usage report can reveal accelerometer data as a usage parameter in the usage report generated for this product by this user. If the usage report reflects an accelerometer recording of a high acceleration for a short time duration, it could indicate that the product was accidentally dropped and not necessarily indicative of a product misuse. In this example, a generated reliability score may not be impacted based on this analysis. Such an analysis may be performed, for example, by applying a low pass filter to the accelerometer time series and scoring only the filtered signals for episodes that exceed the manufacturer's tolerance.

As another example, for an identified user, a usage report can indicate the number of times a product such as a portable drill/driver has been used, e.g., used for screwing deck screws that are detected as attaching deck boards to the joists. This particular use may be recorded along with the ambient environmental temperature. The usage report 300 for that user can record a metric indicating that the battery life was one hour, at 30° F., when driving fifty 3" screws. An analysis reveals that that user's on-line review indicated that the "battery only lasted 1 hr for moderate work," but an analysis of that user's usage report reveals that the on-board sensors indicated that that particular usage was excessive for that moderate duty drill/driver and a reliability score can be lowered to reveal this discrepancy, with an explanation to the user, and perhaps in the rating, to explain that the drill/driver was used in a manner outside the range of use outlined in the operation manual.

A further non-limiting use case example can be the product usage report associated with a product such as a lawnmower where a user submits an on-line product review indicating that the lawnmower blade bent or was dull after one year of usage and was a poor product. However, the product usage report 300 for that user can reveal that the user always mowed over rocks and tree stumps thus contributing to the product's premature poor performance. A lower reliability score can be generated for that user based on the analysis of the lawnmower product misuse. This "lowered" reliability score can indicate to a subsequent on-line reviewer that the on-line product review by that user is not entirely accurate based on the analysis of the product lawnmower's misuse.

As a further non-limiting use case example relates to homeowners who purchased a particular model of a corded miter saw. One user uses it for many outdoor projects, including rebuilding a deck while a second user uses it occasionally for some indoor projects like cutting window trim. The first user has been cutting the old boards that were removed from the deck into smaller pieces, as well as cutting the new boards to length. After a weekend's worth of work, that first user is unhappy with the sharpness of that model's carbide saw blade that was included with the saw when purchased, and that he can't cross cut a 2×8 deck board because the saw doesn't have enough range. That first user writes a negative on-line review of the saw, giving it 2 of 5 stars, indicating, "the saw blade dulled quickly and I had to replace it which cost me $45, and who designs a crop saw that can't cross cut a 2"×8" piece of pressure treated deck board?" Consulting both the product's onboard sensor camera and the recording of the microphone indicates in the usage report that that first user had been cutting old boards with nails that dulled the blade. Furthermore, consulting the owner's manual shows that the maximum cross cut on this saw is 6". Thus, the analysis conducted at 417, when applied to that first user's review, could indicate that he cut nails while using the saw, and that he attempted to use it to cut wider boards that specified in the technical specs. This would require a lowering of that first user's reliability score for this particular product review.

Continuing to FIG. 5, step 420, the manufacturer webserver or on-line retailer server can link the received usage report for that user to that user's on-line product review. This linking can be via matching a user name, or an internet protocol (IP) address. In addition, as a result of the analysis, at 425, FIG. 5, the generated reliability score for that user is also linked to the user product review. In a further embodiment, the method can include linking together all customer reviews submitted online by a given user for all products that user used and has submitted reviews for, for example linking by that user's username, IP address, etc.

Thus, in embodiments, any subsequent reader of the on-line product review can ascertain the reliability of the user's review based on the generated reliability score given the product's acceptable use or potential inappropriate use/abuse by that user. For example, given the data and/or feedback evaluation of the usage report 300, the subsequent reader of the on-line product review may not attribute much weight to that user's review.

Figure 6:
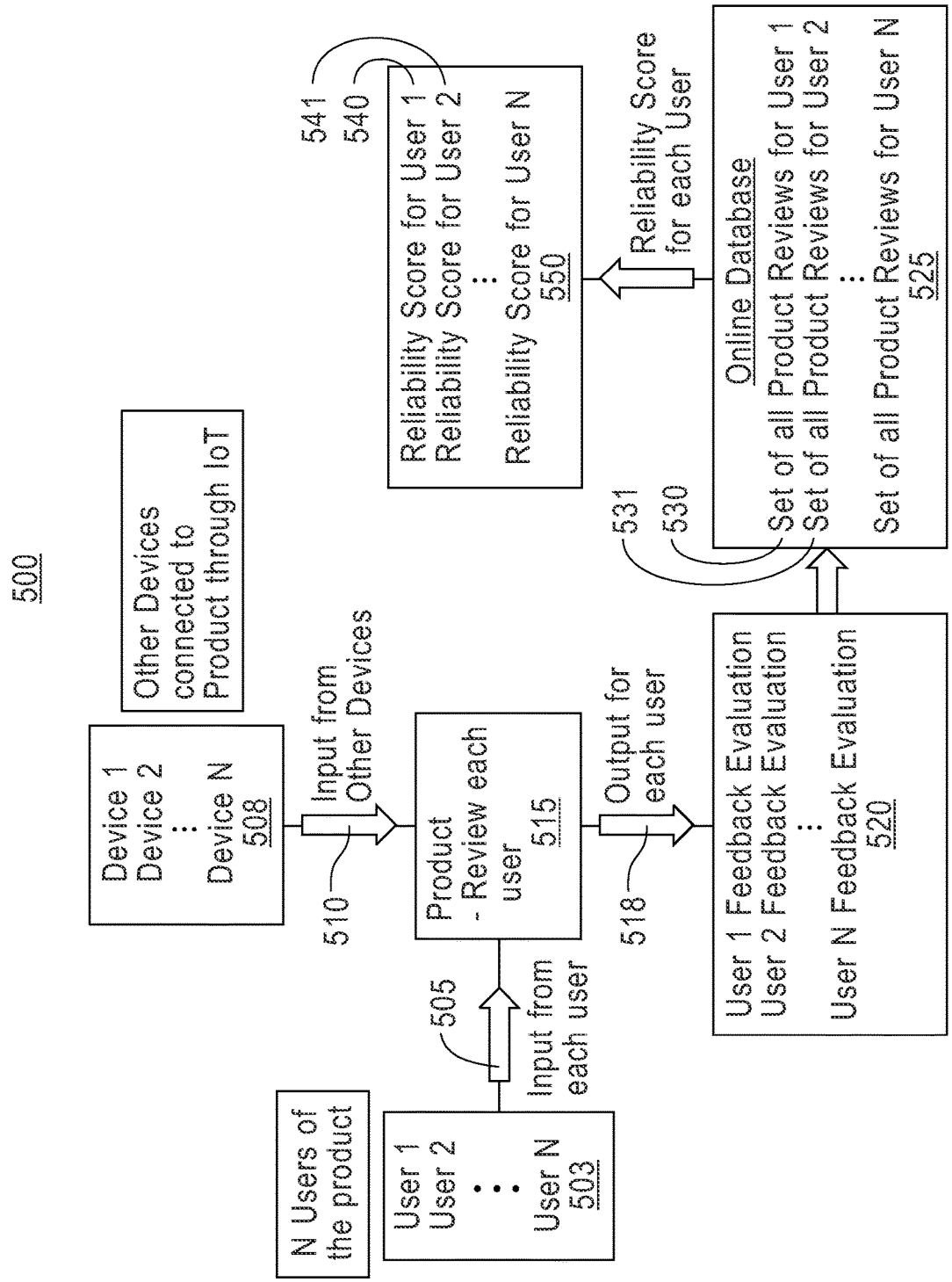
FIG. 6 depicts a method for generating a reliability score for a user based on aggregate usages of products and reviews by users.

FIG. 6 depicts a method for generating a reliability score for a user based on aggregate usages of products and multiple reviews by users. The scenario depicted in FIG. 6 depicts a situation in which a manufacturer or analytics platform computer system 200 may aggregate users' usage reports for products for use by an on-line retailer for generating a user's reliability score based on that user's aggregate product usage. In addition, aggregation may occur by product category, or by products that are used together (for example a circular saw and a circular saw blade). As shown in FIG. 6, there are multiple users, e.g., N users 503, of the main product 515. In an embodiment, the analytics platform or like computer system 200 receives an input 505 from each user of the product that can include the contents of a usage report associated by a respective user. In the embodiment depicted in FIG. 6, further input is received at the computer system including sensor data from other I-o-T devices 508 connected to or operating in conjunction with the product 515 being reviewed. Further, at 518, FIG. 6, there is depicted a result of an analysis conducted to generate for each respective user of product 515 a respective feedback evaluation report 518. That is, the user product usage inputs 505 and I-o-T sensor data input 510 from other devices are processed by analytics platform computer system 200 which generates a respective feedback evaluation report output 518 associated with each respective user of the product. Aggregated feedback evaluation reports 518 for each of the multiple users, e.g., User, User2, . . . User N, are stored at 520. Each feedback evaluation report is stored at a database 131 for association with each user.

In an embodiment, for each of the multiple users, features from data generated by the product for the usage reports associated with the product's use by each of the multiple users can be aggregated to provide a user feedback evaluation 518. For example, the on-board data can be used to display the average time that a product, e.g., a drill, was used, the range or torque settings, the range of battery charge during use, the range of outdoor temperature when the product was used, the range of projects that the drill was used. Statistics can be generated from this raw data which can be used to display a warning or message for these users to help them operate the product within the range of "real-world" use cases. For instance, even though the operation manual might specify that the drill/driver is supposed to be operated above 40° F., the statistics might indicate that a user obtained a 20 minute battery life when it was operated at 20° F. A user might find that data useful for an occasional use of the drill/driver at such a low temperature and may not be disappointed at the short battery life given the pervious user's experience.

In FIG. 6, the data input steps 505, 510 and feedback evaluation report generation steps 518 can be repeated for each of multiple products, such that the product reviews and evaluation reports are generated for each user, e.g., User, User2, . . . User N, associated with each user's use of a variety of multiple products, e.g., whether they are products by the same manufacturer that are used by the same users, e.g., User 1, User 2, . . . , User N, or different products of different manufacturer's used by the same users, e.g., User 1, User 2, . . . , User N. These respective feedback evaluation reports generated for each respective user, e.g., User 1, User 2, . . . , User N, are input to an on-line database 520 for storage thereat, and each report for each user is aggregated according to each user. Further, the on-line database, receives and aggregates a set 525 of all product reviews and feedback evaluations for a respective user, e.g., User 1, User 2, . . . , User N according to the multiple products each user uses and has reviewed. For example, there is stored at 530 a set of all product reviews received for User 1's usage of products, and at 531, there is stored a set of all product reviews received for User 2's usage of products. Given the set of all product reviews for a respective user, an analysis is conducted to generate a reliability score for that respective user, e.g., a reliability score 540 for User 1 is generated based on the aggregate of all products reviews 530 and feedback evaluations (e.g., usage reports) generated by and for the User 1 for all products User 1 uses; a reliability score 541 for User 2 is generated based on the aggregate of all products reviews 531 and feedback evaluations (e.g., usage reports) generated by and for the User 2 for all products User 2 uses, etc. Each of these reliability scores 550 is generated for each respective user and each is linked to any on-line product review provided by that user. The reliability scores, when indicated with users' on-line product reviews, provide a basis for subsequent buyers to determine the veracity of users' on-line review of that product. For example, a reliability score can be generated for each user, so that all who read his or her reviews will have additional information on how this person uses the products. For example, on the basis of the product's usage report and an assigned "low" reliability score, a subsequent reviewer can determine that while a product was misused by a user, the product actually held up quite well over time notwithstanding its misuse, and the low reliability score was provided in this case for a user that reviewed the product positively because it held up well to the abuse. This has the effect of adding credibility to the user's good review. Alternatively, for example, on the basis of the product's usage report and a high reliability score, a subsequent reviewer can determine that while a product was used correctly, it did break down rather quickly after not many uses and therefore the product user gave it a negative review and a low rating. This has the effect of adding credibility to the user's poor review.

In a further embodiment, a survey (not shown) can be given to the product user that is supplemental to the user's product review. The physical survey can be administered to a user (e.g., on paper or on-line), which survey can be used to determine the product's use by that user. The results of the survey can be used to compare the reliability of the product's rating by a user, with the usage report generated for that product (e.g., to determine whether the product was used as intended or was misused, or to supplement or compare to the on-board sensors readings as a means to determine whether the on-board sensors were in need of calibration). For example, in determining the reliability of an on-board accelerometer or applied force sensor, a usage report can indicate instances of a high acceleration or applied force of a product's use, but the survey can indicate that the user always used the product correctly. This may reveal that either the user dropped the product (thus the reason for the detected instances of high acceleration) or it could indicate that the sensors may not be accurately calibrated albeit the product was used correctly. In an example drill product, in the case that the user tended to break drill bits, the applied force sensor might indicate that the upper applied too much force with using the drill.

Figure 7:
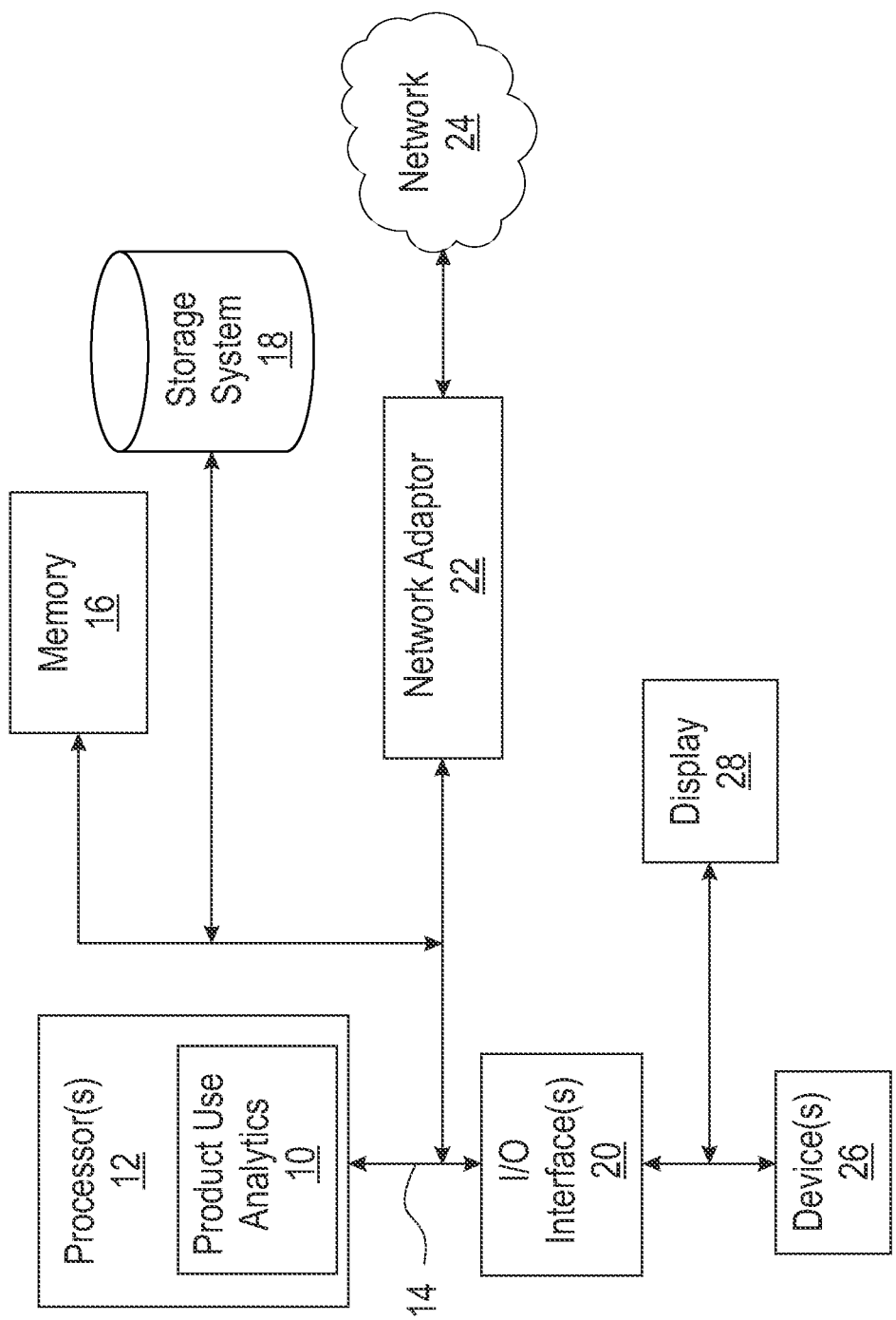
FIG. 7 illustrates a schematic of an example computer or processing system that may implement the product usage analysis framework in the embodiments of the present disclosure.

FIG. 7 illustrates a schematic of an example computer or processing system that may implement the framework employing product usage feedback and analytics for reviewing a product's usage by its users and for determining how closely the product has been used according to its intended use and for recommending user behavioral changes for optimizing a product's function, lifespan, efficiency in the embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. An product usage analytics module 10 having instructions employing the methods herein may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, and external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls). Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure that includes a network of interconnected nodes.

Figure 8:
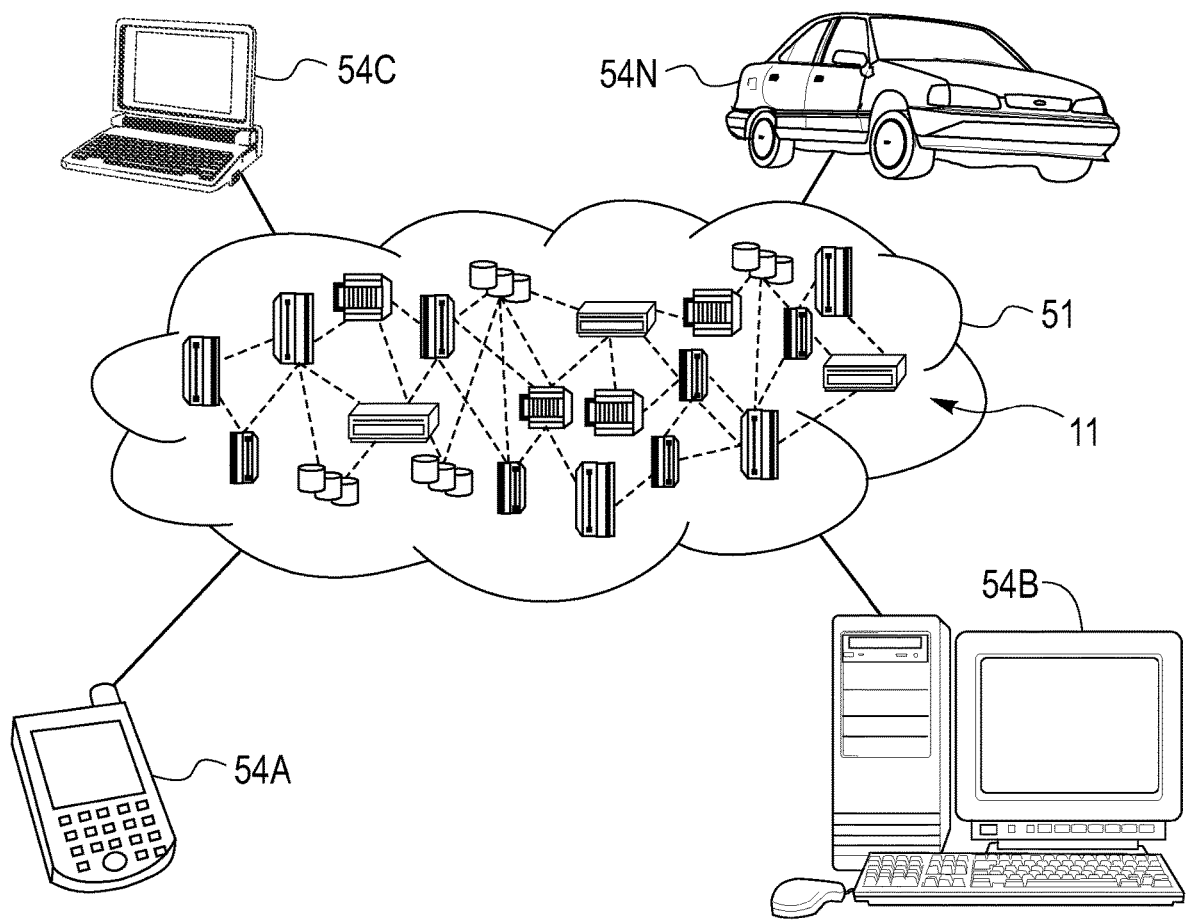
FIG. 8 depicts a cloud computing environment according to an embodiment of the present invention.

Referring now to FIG. 8, illustrative cloud computing environment 51 is depicted. As shown, cloud computing environment 51 includes one or more cloud computing nodes 11 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 11 and cloud computing environment 51 can communicate with any type of computerized device over any type of network and/or network addressable connection (e.g., using a web browser).

Figure 9:
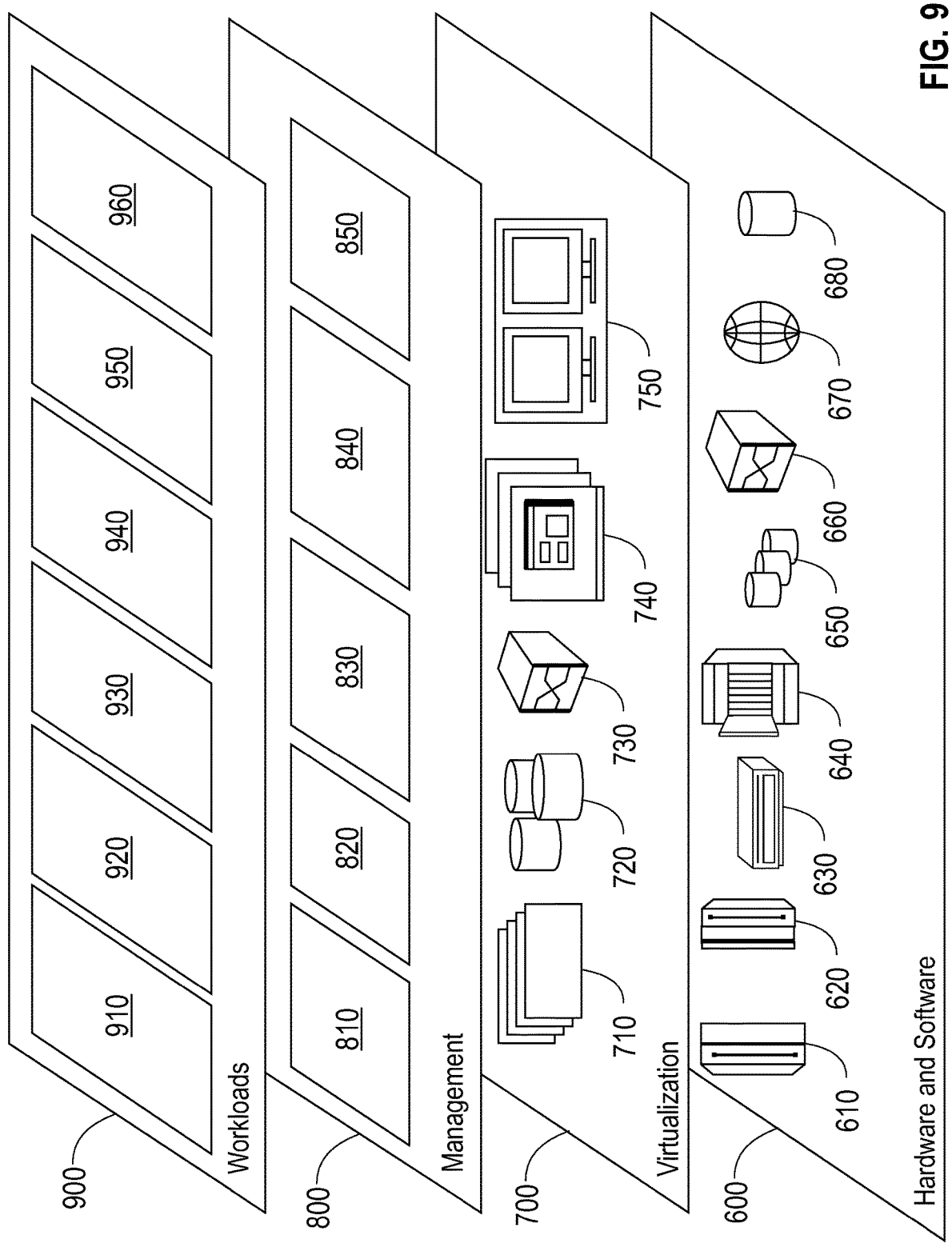
FIG. 9 depicts abstraction model layers according to an embodiment of the present invention.

Referring now to FIG. 9, a set of functional abstraction layers provided by cloud computing environment 51 (FIG. 8) is shown. It should be understood in advance that the components, layers, and functions shown in FIG. 9 are intended to be illustrative only and embodiments of the invention are not limited thereto. As depicted, the following layers and corresponding functions are provided: Hardware and software layer 600 includes hardware and software components. Examples of hardware components include: mainframes 610; RISC (Reduced Instruction Set Computer) architecture based servers 620; servers 630; blade servers 640; storage devices 650; and networks and networking components 660. In some embodiments, software components include network application server software 670 and database software 680. Virtualization layer 700 provides an abstraction layer from which the following examples of virtual entities may be provided: virtual servers 710; virtual storage 720; virtual networks 730, including virtual private networks; virtual applications and operating systems 740; and virtual clients 750. In one example, management layer 800 may provide the functions described below. Resource provisioning 810 provides dynamic procurement of computing resources and other resources that are utilized to perform tasks within the cloud computing environment. Metering and Pricing 820 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 830 provides access to the cloud computing environment for consumers and system administrators. Service level management 840 provides cloud computing resource allocation and management such that required service levels are met. Service Level Agreement (SLA) planning and fulfillment 850 provide pre-arrangement for, and procurement of, cloud computing resources for which a future requirement is anticipated in accordance with an SLA. Workloads layer 900 provides examples of functionality for which the cloud computing environment may be utilized. Examples of workloads and functions which may be provided from this layer include: mapping and navigation 910; software development and lifecycle management 920; virtual classroom education delivery 930; data analytics processing 940; transaction processing 950; and a product user analytics and feedback evaluation framework to determine how effective each user is at rating the product by creating a feedback evaluation report and reliability score for each user, giving weight to basically all product reviews that the user may have submitted on other products 960.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for product evaluation comprising:
uniquely identifying, using one or more onboard sensor devices at the product, an identity of the user of the product;
sensing, using the one or more onboard sensor devices, one or more different aspects of the product's operation by an identified user, an onboard sensor comprising an accelerometer sensor to measure an acceleration of the product;

recording, at a programmed processor at the product, data relating to said different aspects of the product's usage by the identified user, the recorded data comprising accelerometer sensor data provided from said accelerometer sensor, said accelerometer sensor data indicating forces applied to and applied by the product;

applying a low pass filter to recorded accelerometer sensor data to detect a product usage that exceeds a pre-determined use tolerance;

identifying, by the programmed processor, in response to detecting a product usage that exceeds the pre-determined use tolerance, an operation of said product that is not in compliance with a recommended guideline directing how the product should be used;

generating, using the programmed processor at the product, a data report summarizing sensed product usage behaviors in which a product is being used by the identified user;

receiving, at a processor running at a remote computer device, a product review submitted on-line by the identified user about the product;

receiving, at the processor running at the remote computer, the data report summarizing sensed product usage behavior by the identified user; and linking, by the processor running at a remote computer device, said generated data report associated with the identified user to the review submitted on-line by said identified user, said linking comprising a matching of an internet protocol (IP) address associated with both the identified user's uploaded product usage behavior data report and the received user's on-line product review;

analyzing, by the processor running at the remote computer device, a content of said linked data report against a content of said on-line review generated by the identified user;

generating, at the programmed processor running at the remote computer device, based on said analyzing, a reliability score indicating an accuracy of said on-line review in view of said data report content regarding that products usage operation by the identified user, said reliability score correlating a degree of how closely the identified user followed the recommended guideline, wherein subsequent third party reviewers can access said generated reliability score to evaluate a veracity of said on-line product review submitted by the identified user.

2. The method of claim 1, further comprising:

obtaining, at the programmed processor at the product, a data upload from one or more Internet-of-Things (I-o-T) sensor(s) associated with the product's operation by a user.

3. The method of claim 1, wherein said product has associated manufacturer-suggested guidelines directing recommended use of the product, said method further comprising:

generating, at said product, during the product's operation, a warning for a given user indicating an operation detected as not in compliance with said suggested guideline.

4. The method of claim 1, wherein said one or more sensor devices comprises one or more of:

a camera sensor, a microphone sensor, a temperature sensor for measuring product or ambient temperature on the product.

5. The method of claim 4, wherein said data relating to said different aspects features of the product's usage comprise one or more of:

facial recognition data based on output received from said camera sensor, voice recognition data based on output received from said microphone sensor, and temperature data based on output received from the temperature sensor.

6. The method of claim 4, wherein said data report summarizing sensed product usage behaviors comprise one or more of:

a product type, an identity of the user operating the product, a time duration of operating said product, one or more parameters associated with said product during its operation, one or more parameters associated with said user while operating the product, a detected range of items that the product was used upon.

7. The method of claim 4, further comprising:

analyzing sensed product usage behaviors;

detecting an accuracy of said one or more onboard sensor devices; and generating a warning message to a user to calibrate the one or more sensors based on said detected accuracy.

8. A system for evaluating a product comprising:

at a product, one or more onboard sensor devices for uniquely identifying an identity of the user of the product, said one or more onboard sensor devices further sensing one or more different aspects of the product's operation by a user, an onboard sensor comprising an accelerometer sensor to measure an acceleration of the product;

a processor and a computer-readable memory coupled to the processor, wherein the memory comprises instructions which, when executed by the processor, cause the processor to:

record at the product, data relating to said different aspects of the product's usage by the identified user, the recorded data comprising accelerometer sensor data provided from said accelerometer sensor, said accelerometer sensor data indicating forces applied to and applied by the product;

apply a low pass filter to recorded accelerometer sensor data to detect a product usage that exceeds a pre-determined use tolerance;

identify, at the product, in response to detecting a product usage that exceeds the pre-determined use tolerance, an operation of said product that is not in compliance with a recommended guideline directing how the product should be used;

generate at the product, a data report summarizing sensed product usage behaviors in which a product is being used by the identified user; and upload, to a processor running at a remote computer device, a product review submitted on-line by the identified user about the product;

upload, to the processor running at the remote computer, the data report summarizing sensed product usage behavior by the identified user; and at the processor running at the remote computer, link said generated data report associated with the identified user to the review submitted on-line by said identified user, said linking comprising a matching of an internet protocol (IP) address associated with both the identified user's uploaded product usage behavior data report and the received user's on-line product review; and analyze, by the processor running at the remote computer device, a content of said linked data report against a content of said on-line review generated by the identified user;

generate, at the programmed processor running at the remote computer device, based on said analyzing, a reliability score indicating an accuracy of said on-line review in view of a content of said data report regarding that product's usage operation by the identified user, said reliability score correlating a degree of how closely the identified user followed the recommended guideline, wherein subsequent third party reviewers can access said generated reliability score to evaluate a veracity of said on-line product review submitted by the identified user.

9. The system of claim 8, further comprising:
Internet-of-Things (I-o-T) sensor(s) associated with the product's operation by a user, said programmed processor further configured to:
obtain at the product, a data upload from one or more Internet-of-Things (I-o-T) sensor(s) associated with the product's operation by a user.

10. The system of claim 8, wherein said product has associated manufacturer-suggested guidelines directing recommended use of the product, said programmed processor further configured to:
detect an operation of said product that is not in compliance with any associated manufacturer-suggested guideline.

11. The system of claim 8, wherein said one or more sensor devices comprises one or more of:
a camera sensor, a microphone sensor, a temperature sensor for measuring product or ambient temperature on the product.

12. The system of claim 11, wherein said data relating to said different aspects features of the product's usage comprise one or more of:
facial recognition data based on output received from said camera sensor,
voice recognition data based on output received from said microphone sensor, and
temperature data based on output received from the temperature sensor.

13. The system of claim 11, wherein said data report summarizing sensed product usage behaviors comprise one or more of:
a product type, an identity of the user operating the product, a time duration of operating said product, one or more parameters associated with said product during its operation, one or more parameters associated with said user while operating the product, a detected range of items that the product was used upon.

14. A computer program product for improving features of a product, the computer program product comprising a computer-readable storage medium having a computer-readable program stored therein, wherein the computer-readable program, when executed on a computer system comprising at least one processor, causes the processor to perform:
uniquely identifying, using one or more onboard sensor devices at the product, an identity of the user of the product;
sensing, using the one or more onboard sensor devices, one or more different aspects of the product's operation by an identified user, an onboard sensor comprising an accelerometer sensor to measure an acceleration of the product;

recording at the product, data relating to said different aspects of the product's usage by the identified user, the recorded data comprising accelerometer sensor data provided from said accelerometer sensor, said accelerometer sensor data indicating forces applied to and applied by the product;

applying a low pass filter to recorded accelerometer sensor data to detect a product usage that exceeds a pre-determined use tolerance;

identifying, by the programmed processor, in response to detecting a product usage that exceeds the pre-determined use tolerance, an operation of said product that is not in compliance with a recommended guideline directing how the product should be used;

generating at the product, a data report summarizing sensed product usage behaviors in which a product is being used by the identified user;

receiving, at a processor running at a remote computer device, a product review submitted on-line by the identified user about the product;

receiving, at the processor running at the remote computer, the data report summarizing sensed product usage behavior by the identified user;

linking, by the processor running at a remote computer device, said generated data report associated with the identified user to the review submitted on-line by said identified user, said linking comprising a matching of an internet protocol (IP) address associated with both the identified user's uploaded product usage behavior data report and the received user's on-line product review;

analyzing, by the processor running at the remote computer device, a content of said linked data report against a content of said on-line review generated by the identified user;

generating, at the programmed processor running at the remote computer device, based on said analyzing, a reliability score indicating an accuracy of said on-line review in view of said data report content regarding that products usage operation by the identified user, said reliability score correlating a degree of how closely the identified user followed the recommended guideline, wherein subsequent third party reviewers can access said generated reliability score to evaluate a veracity of said on-line product review submitted by the identified user.

15. The computer program product of claim 14, wherein said product has associated manufacturer-suggested guidelines directing recommended use of the product, said processor is further configured to perform:
detecting an operation of said product that is not in compliance with any associated manufacturer-suggested guideline.

16. The computer program product of claim 14, wherein said one or more sensor devices comprises one or more of:
a camera sensor, a microphone sensor, a temperature sensor for measuring product or ambient temperature, an accelerometer sensor on the product, wherein said data relating to said different aspects features of the product's usage comprise one or more of:
facial recognition data based on output received from said camera sensor,
voice recognition data based on output received from said microphone sensor, and temperature data based on output received from the temperature sensor.

17. The computer program product of claim 16, wherein said data report summarizing sensed product usage behaviors comprise one or more of:
a product type, an identity of the user operating the product, a time duration of operating said product, one or more parameters associated with said product during its operation, one or more parameters associated with said user while operating the product, a detected range of items that the product was used upon.

* * * * *